United States Patent [19]

Fukuta et al.

[11] 4,336,296

[45] Jun. 22, 1982

[54] THREE-DIMENSIONALLY LATTICED FLEXIBLE-STRUCTURE COMPOSITE

[75] Inventors: Kenji Fukuta, Yokohama; Ryuzo Onooka, Ayase; Eiji Aoki, Hachioji; Shigeo Tsumuraya, Yokohama, all of Japan

[73] Assignees: Agency of Industrial Science & Technology; Ministry of International Trade & Industry, both of Tokyo, Japan

[21] Appl. No.: 107,913

[22] Filed: Dec. 27, 1979

[30] Foreign Application Priority Data

Dec. 27, 1978 [JP] Japan ................................. 53-162704
Mar. 31, 1979 [JP] Japan ................................. 54-39225

[51] Int. Cl.³ .............................................. D32B 7/00
[52] U.S. Cl. .................................... 428/257; 428/260;
428/272; 428/273; 428/274; 428/296;
428/312.2; 428/312.6; 428/312.8; 139/383 B;
139/408
[58] Field of Search ............... 428/257, 260, 272, 273,
428/274, 296, 304, 317

[56] References Cited

U.S. PATENT DOCUMENTS 4,020,209  4/1977  Yuan ................................... 428/257
4,131,708  12/1978  Moores .............................. 428/257

FOREIGN PATENT DOCUMENTS 50-5670  1/1975  Japan .

OTHER PUBLICATIONS

"Applied Polymer Symposium" No. 15, pp. 103–111, 1970.

Primary Examiner—Marion McCamish
Attorney, Agent, or Firm—Oblon, Fisher, Spivak, McClelland & Maier

[57] ABSTRACT

A three-dimensionally latticed flexible-structure composite, including a three-dimensional lattice formed of longitudinal, lateral and vertical strings and a matrix formed by selectively impregnating the component strings of the aforementioned lattice with a molten plastic, the precursor of the matrix, and allowing the molten plastic adhering to the strings to solidify.

4 Claims, 24 Drawing Figures

Fig_1(A)
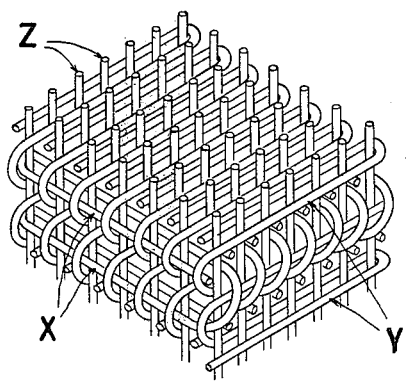
Fig_1(B)
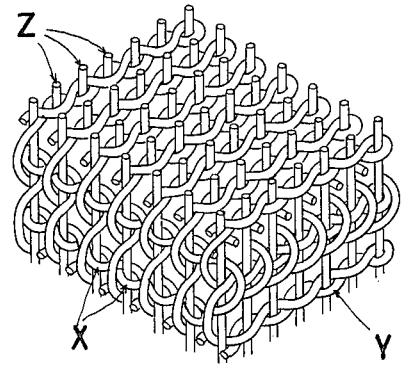
Fig_2
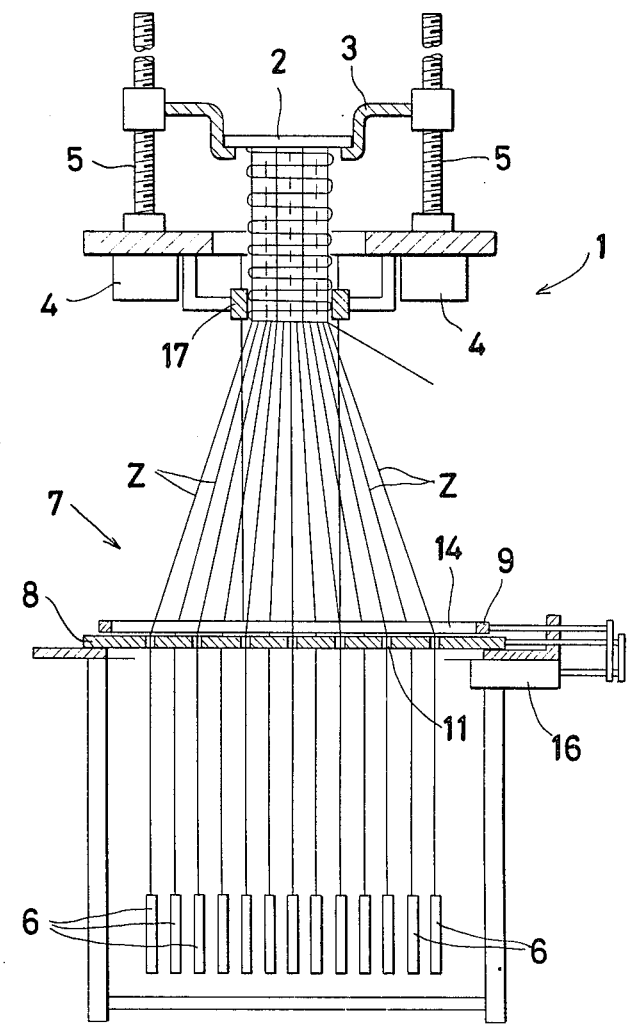

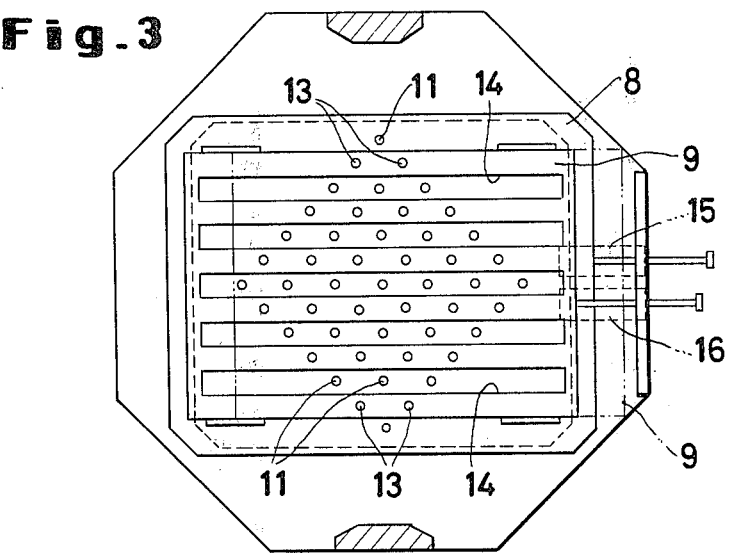
Fig_3
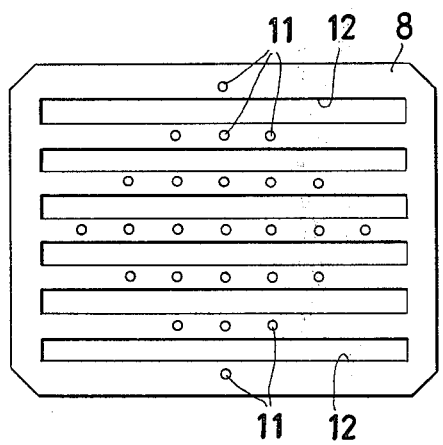
Fig_4(A)
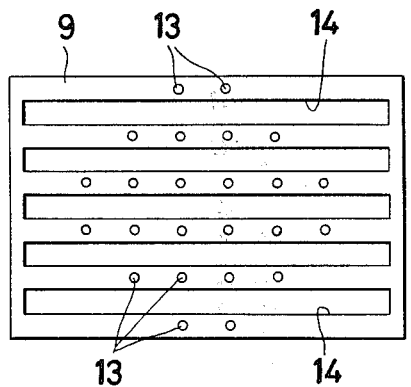
Fig_4(B)
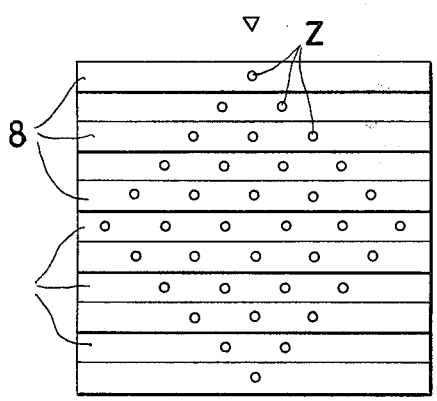
Fig_5(A)
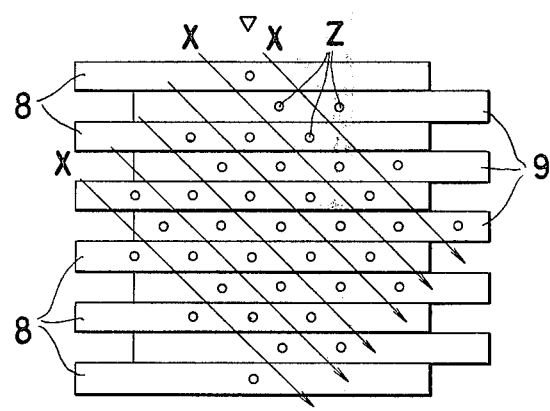
Fig_5(B)

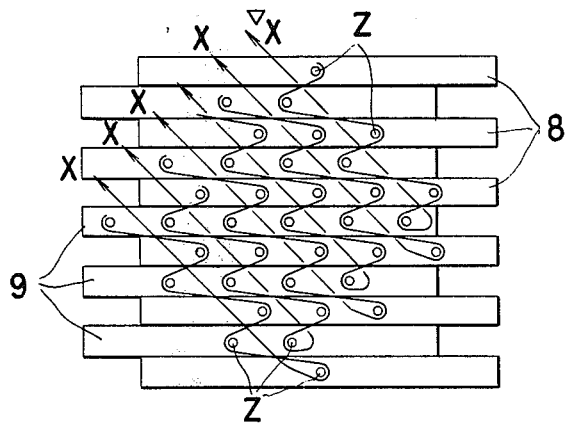
Fig_5(C)
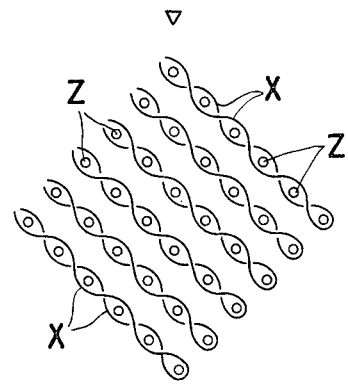
Fig_5(D)
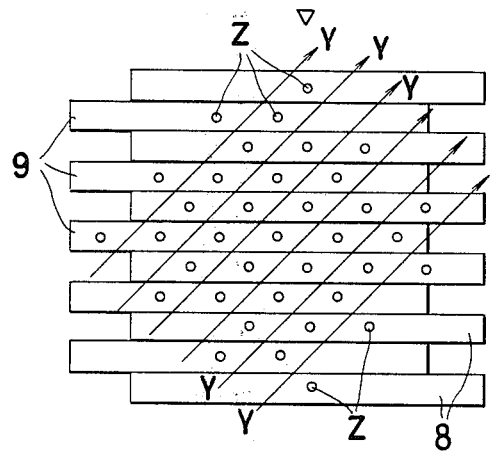
Fig_5(E)
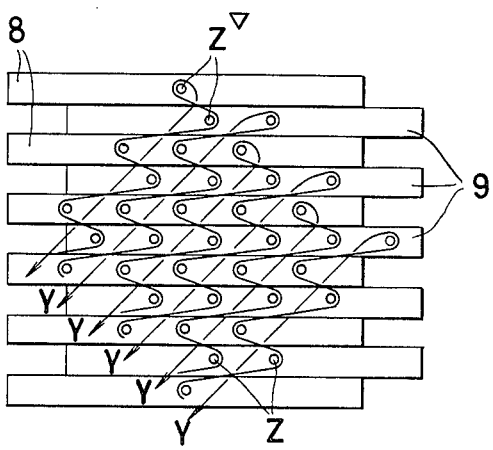
Fig_5(F)
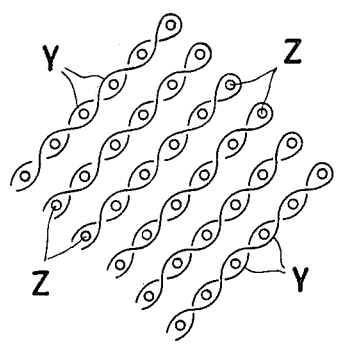
Fig_5(G)
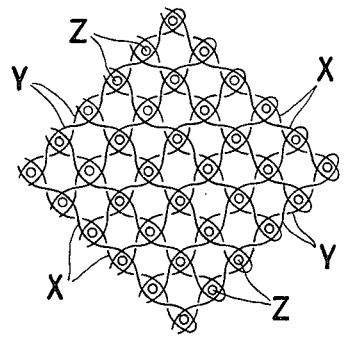
Fig_5(H)

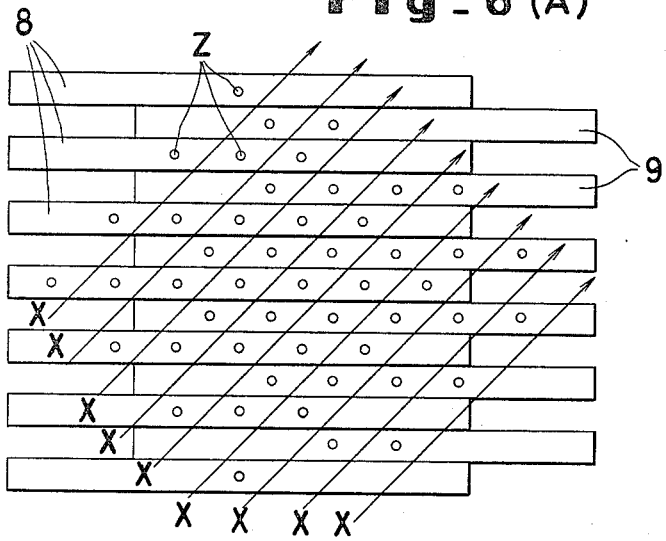
Fig_6(A)
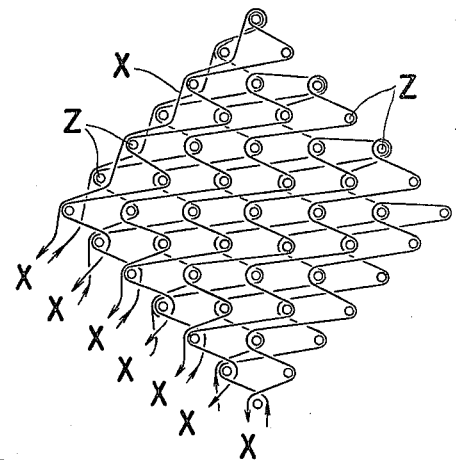
Fig_6(B)
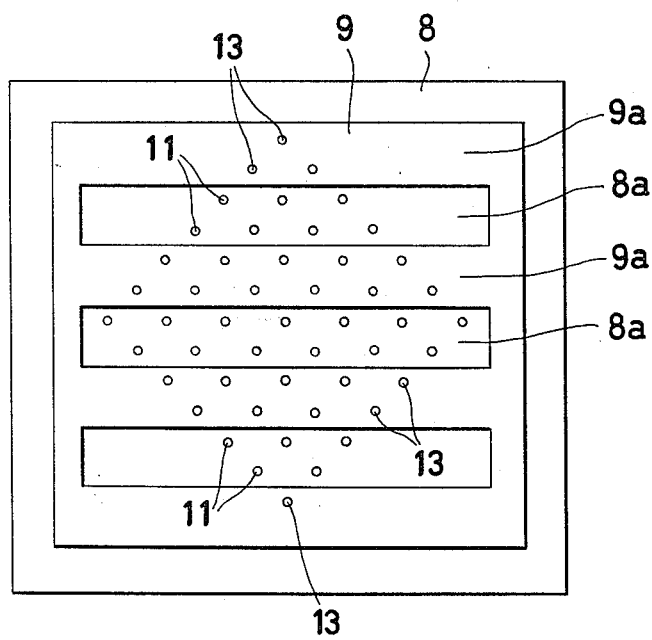
Fig_7(A)
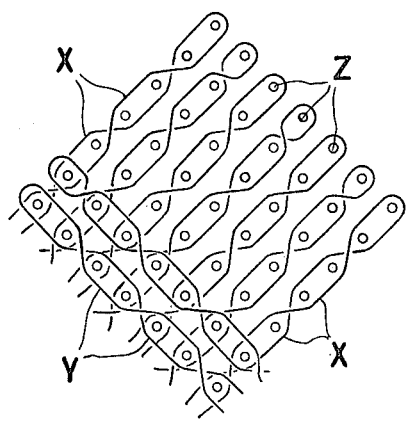
Fig_7(B)

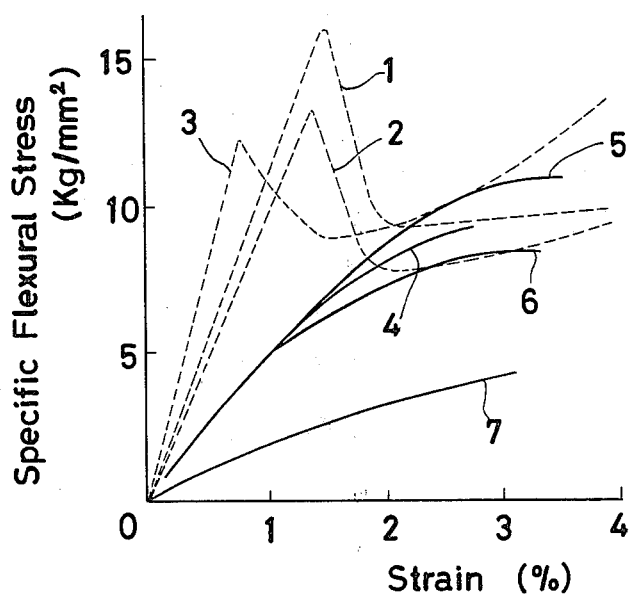
Fig_12
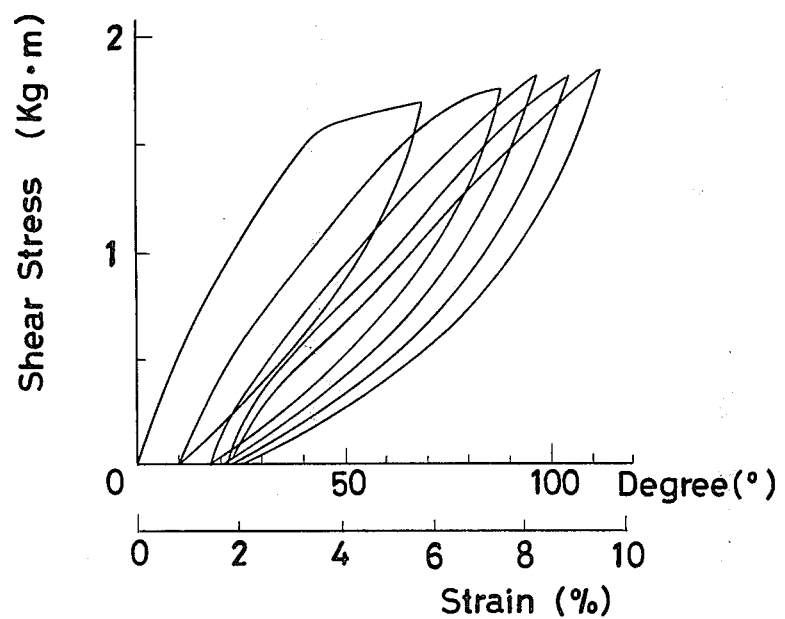
Fig_13

THREE-DIMENSIONALLY LATTICED FLEXIBLE-STRUCTURE COMPOSITE

BACKGROUND OF THE INVENTION

1. Field of the Invention

This invention relates to a three-dimensionally latticed flexible-structure composite, and more particularly to a three-dimensionally latticed flexible-structure composite advantageously usable in articles which are destined to undergo repeated exertion of heavy loads and, therefore, require great strength for the absorption of such external impacts.

2. Description of the Prior Art

Three-dimensionally fiber-reinforced composite materials which have heretofore been extensively utilized (such as the products dealt with in "Applied Polymer Symposium", No. 15, 103–111, 1970) generally lack porosity. A few others may possess porosity merely because they contain voids such as the numerous cells which are randomly distributed in their matrices.

The aforementioned three-dimensionally fiber-reinforced composite materials of the prior art betray inferior mechanical strength upon exposure to repeatedly exerted loads. Although those possessing porosity enjoy the advantage of light weight, they nevertheless are likewise deficient in mechanical strength.

SUMMARY OF THE INVENTION

An object of this invention is to provide a flexible-structure composite which exhibits high mechanical strength against repeatedly exerted loads and, at the same time, enjoys the advantage of light weight.

To accomplish the object described above according to the present invention, there is provided a flexible-structure composite which including a three-dimensional lattice composed of strings interlaced in the longitudinal, lateral and vertical directions in a prescribed pattern and a matrix formed around all the surfaces of the component strings of the lattice by selectively impregnating the strings with a molten plastic, the precursor for the matrix, and allowing the plastic adhering to the strings to set and thereby causing the component strings of the lattice to be coated with the matrix and the minute intervening spaces between the adjacent strings to be left unfilled.

Since the composite of the present invention is obtained in the form of a three-dimensional lattice as described above, it possesses high mechanical strength sufficient to withstand repeatedly exerted loads and also excels in specific bending strength. Moreover, because of its three-dimensionally latticed structure, the composite enjoys the advantage of light weight. Thus, it finds extensive utility as structural materials in buildings, aircraft and ships, as shock-absorbing materials for various applications, and as air-pervious materials in houses, for example.

The other objects and characteristics of this invention will become apparent from the further disclosure of the invention to be given below with reference to the accompanying drawing.

BRIEF EXPLANATION OF THE DRAWINGS

FIG. 1(A) is a perspective view of one embodiment of the three-dimensional lattice which is used as the core of the flexible-structure composite according to the present invention.

FIG. 1(B) is a perspective view of another embodiment of the aforementioned three-dimensional lattice.

FIG. 2 is a sectioned view of one embodiment of an apparatus to be used for interlacing the three-dimensional lattice of FIG. 1(B).

FIG. 3 is a plan view of a heald device incorporated in the interlacing apparatus of FIG. 2.

FIGS. 4A and 4B is a plan view illustrating heald bars incorporated in the heald device of FIG. 3.

FIGS. 5(A-H) is an explanatory diagram illustrating the first embodiment of the present invention whereby the interlacing of the three-dimensional lattice is effected by use of the interlacing apparatus of FIG. 2.

FIGS. 6A and 6B is an explanatory diagram illustrating the second embodiment of this invention whereby the interlacing of the three-dimensional lattice is effected by use of the apparatus of FIG. 2.

FIGS. 7A and 7B is an explanatory diagram illustrating the third embodiment of this invention whereby the interlacing of the three-dimensional lattice is effected by use of the apparatus of FIG. 2.

FIG. 12 is a graph showing the relation between the bending strength and strain as observed in the flexible-structure composite of the present invention.

FIG. 13 is a graph showing the relation between the shearing strength and strain as observed in the flexible-structure composite of the present invention.

DETAILED DESCRIPTION OF THE PREFERRED EMBODIMENTS

Figure 8:
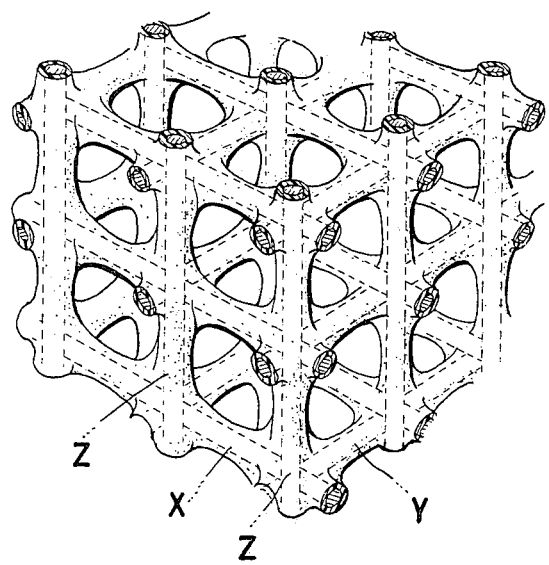
FIG. 8 is a perspective view of one embodiment of the flexible-structure composite produced by the present invention.

FIG. 1(A) and FIG. 1(B) illustrate typical constructions of the three-dimensional lattice which forms the basic element of the flexible-structure composite of this invention. The three-dimensional lattice is composed of longitudinal strings Z, lateral strings X and vertical strings Y. FIG. 1(A) represents a construction wherein all the component strings are simply caused to traverse each other at right angles without being wound about each other and FIG. 1(B) a construction wherein the lateral strings and the vertical strings are intertwined with each other after the pattern of plain weave in the spaces intervening between the adjacent longitudinal strings which are laid straight parallelly to each other. In these three-dimensional lattice constructions, the lateral strings X and the vertical strings Y may intersect each other at substantially the same positions or at different positions relative to the longitudinal strings Z.

To cite a typical technique which is used for fabricating the aforementioned three-dimensional lattice, Japanese Patent Disclosure No. 5670/1975 teaches a method which comprises moving the rows of longitudinal strings parallelly to each other thereby allowing vertical strings to be inserted therebetween, then rotating the vertical strings by an angle of 90° thereby transforming them into longitudinal strings, and moving the newly formed rows of longitudinal strings parallelly to each other thereby allowing the lateral strings to be inserted therebetween, giving rise to a three-dimensional lattice. This three-dimensional lattice may otherwise be produced by using the apparatus of the construction shown in FIGS. 2-5 which has been proposed by the present inventors.

Specifically, in the apparatus illustrated in FIG. 2, a frame 1 has vertically movably supported thereon a pair of setting frames 3 serving to retain in position therebetween a support plate 2 adapted to suspend a multiplicity of longitudinal strings. The setting frames 3 are adapted to be driven up and down either by screw shafts 5 synchronously rotated by a motor and helically inserted through the setting frames 3 or by some other suitable means. In the aforementioned longitudinal string support plate 2, setting holes for passing longitudinal strings therethrough are spaced longitudinaly and laterally in accordance with the condition in which the longitudinal strings are arranged in a three-dimensional lattice to be fabricated. From each of the longitudinal string setting holes is hung a longitudinal string Z stretched taut with a weight 6 attached to the lower end of the string.

A heald device 7 disposed about the middle of the frame 1 is provided, as illustrated in FIGS. 2-4, on the aforementioned frame 1 with a first heald bar 8 and a second heald bar 9 which are both slidably mounted. In the heald device 7, the holes for the longitudinal strings Z are longitudinally and laterally spaced in rows and files. In the drawing, the entire array of longitudinal rows and lateral files of longitudinal strings is slanted by an angle of 45°.

In the first heald bar 8, series of holes 11 each for passing a train of longitudinal strings and slits 12 each for passing a train of longitudinal strings are alternately perforated for the trains of longitudinal strings obliquely crossing the rows and files of longitudinal strings as illustrated in FIG. 4(A). In the second heald bar 9, trains of holes 13 each for passing longitudinal strings are perforated correspondingly to the slits 12 formed in the first heald bar 8 and slits 14 each for passing a train of longitudinal strings are perforated correspondingly to the trains of holes 13 formed in the first heald bar 8 as illustrated in FIG. 4(B). In the heald device illustrated in the drawing, the trains of holes for passing the longitudinal strings perforated in the first heald bar 8 and those perforated in the second heald bar 9 are alternately disposed. Optionally, trains each formed of a plurality of rows, or a desired number of rows, of longitudinal strings may be arranged alternately on the two heald bars. In the aforementioned first heald bar 8 and second heald bar 9, the trains of holes for passing longitudinal strings and the slits for passing trains of longitudinal strings may be alternately perforated in each of the plates as illustrated. Otherwise, the trains of holes for passing longitudinal strings may be separated and rendered independently slidable relative to one another or the holes in one or a plurality of trains may be selectively integrated. The aforementioned first and second heald bars 8, 9 are adapted so that they can be moved one way or the other from the standard position (the position indicated by the solid line in FIG. 3) as the center in the direction of the trains of holes perforated therein by a pitch which corresponds to one or more intervals between the holes. In order for the first and second heald bars 8, 9 to be moved with a required timing in the manner described afterward, they are interlocked to their respective drive means 15, 16. In the illustrated heald device 7, the first and second heald bars 8, 9 are adapted so as to be slid mutually in accordance with the positions in which the lateral strings and the vertical strings are to be inserted into the spaces intervening between the adjacent longitudinal strings. Optionally, this heald device 7 may be designed so that the first heald bar 8 will remain first in position and only the second heald bar 9 will be allowed to slide as required.

The longitudinal strings which hang from the support plate 2 are longitudinally and laterally arranged on the heald device by being passed through the slits 14 in the second heald bar 9 for passage of trains of longitudinal strings and the series of holes 11 in the first heald bar 8 for passing independent longitudinal strings or through the trains of holes 13 in the second heald bar 9 for passing independent longitudinal strings and the slits 12 in the first heald bar 8 for passing trains of longitudinal strings. When the second heald bar 9 is moved from the standard position one way or the other in the aforementioned direction, for example, the longitudinal strings which are passed through the holes 13 in the second heald bar 9 are shifted to the position (the position indicated by the chain line in FIG. 3) separated by one or more intervals of the holes from the position occupied by the longitudinal strings which are passed through the holes 11 in the first heald bar 8.

A frame member 17 which is disposed above the frame 1 is intended to define the outside dimensions of the three-dimensional lattice to be fabricated. It is, therefore, desired to be adapted so that the openings formed therein may be properly adjusted to suit the purpose best.

In the apparatus described above, the lateral strings and the vertical strings are to be inserted into the spaces produced by the aforementioned relative movement of the first and second heald bars 8, 9. For the insertion of these strings in the spaces mentioned above, there may be adopted any of the known method such as the shuttle method and the deviation method. The mechanism adopted for this insertion is omitted from the drawing.

Now, the method by which two-dimensional spaces are produced between the longitudinal strings for the insertion of the vertical strings and the lateral strings in the apparatus of the aforementioned construction will be described in conjunction with the method for interlacing the three-dimensional lattice.

Preparatory to the interlacing, as many longitudinal strings as are required are hung from the support plate 2 and passed through the first heald bar 8 and the second heald bar 9, with weights 6 fastened one each to the lower ends of the strings hanging from the heald bars. FIG. 5(A) depicts this condition. In this diagram, the triangle (Δ) is a mark placed to indicate the reference position on the frame 1 for the purpose of facilitating the understanding of the operation of the apparatus.

In the resulting condition, the second heald bar 9 is moved by one pitch to the right by the drive means 16 as shown in FIG. 5(B), with the result that spaces are formed between the rows of longitudinal strings. At this point, lateral strings X are inserted in the direction of the arrow are into these spaces. After this insertion, the second heald bar 9 is returned to its original position.

Then, the first heald bar 9 is moved by one pitch to the right. In the resultant condition illustrated in FIG. 5(C), lateral strings X are inserted in the reverse direction and, thereafter, the first heald bar 8 is returned to its original position. Consequently, there is obtained an interlaced condition as shown in FIG. 5(D).

After the lateral strings have been inserted as described above, the second heald bar 9 is moved by one pitch to the left as shown in FIG. 5(E). In the resulting condition, vertical strings Y are inserted into the spaces formed between the rows of longitudinal strings as indicated by the arrow in the direction perpendicular to the direction in which the lateral strings X have been inserted. After this insertion, the second heald bar 9 is returned to its original position and, at the same time, the first heald bar 8 is moved to the left. And vertical strings Y are inserted in the reverse direction as indicated in FIG. 5(F) and the first heald bar 8 is returned to its original position, with the result that the vertical strings Y are interlaced as shown in FIG. 5(G). Then, in consequence of the aforementioned insertion of the lateral strings X and the vertical strings Y, the interlaced condition of FIG. 5(H) is obtained.

In the procedure described above, the lateral strings X and the vertical strings Y are inserted into the formed spaces independently of each other. This procedure is not critical. The sequence in which the lateral strings and the vertical strings are inserted in the formed spaces and the directions in which these strings are inserted may freely be selected. For example, there may be adopted a procedure which comprises first inserting the lateral strings X in the condition of FIG. 5(B), then inserting the vertical strings Y in the direction perpendicular to the direction of the first insertion, subsequently inserting the lateral strings X in the condition of FIG. 5(C) in the direction opposite the direction of the second insertion and, thereafter, inserting the vertical strings Y in the direction opposite the direction of the third insertion.

FIGS. 6(A), 6(B), represent a case wherein the first and second heald bars 8, 9 are moved by the unit pitch equalling two intervals between the rows of holes for the insertion of longitudinal strings. FIG. 6(A) represents the condition which is assumed in consequence of the procedure which comprises moving the second heald bar 9 from the reference position of FIG. 5(A) by the unit pitch to the right and subsequently inserting the lateral strings X in the spaces consequently formed. FIG. 6(B) represents the condition of the insertion of lateral strings which is obtained in consequence of the subsequent procedure which comprises returning the second heald bar 9 to its original position subsequently to the aforementioned last insertion of the lateral strings and, at the same time, moving the first heald bar 8 by the unit pitch to the right and inserting the lateral strings in the direction opposite to the former insertion, and finally returning the first heald bar to its original position. The insertion of vertical strings is effected in the same manner as described. This insertion is omitted from the drawing.

In the apparatus of the present invention, the first and second heald bars can be moved by the unit pitch of one or more intervals between the rows of holes for insertion of the longitudinal strings as described above. Generally, the lateral strings and the vertical strings are inserted between the rows and files of longitudinal strings at two positions of string insertion. Optionally, the lateral strings or the vertical strings may be inserted at three or more positions of string insertion which are determined by the combination of the shifting positions of the first and second heald bars.

FIG. 7(A) represents a case wherein two rows of holes 11, 13 for passing longitudinal strings are disposed in each of the portions 8a, 9a for passing longitudinal strings in the first and second heald bars 8, 9. In this case, when the first and second heald bars are moved each by the unit pitch (one interval) and the lateral strings X and the vertical strings Z are inserted, there is obtained an interlaced condition as shown in FIG. 7(B). Part of the vertical strings Z is omitted from this drawing.

In the interlacing effected as described above, the timing for the motion of the first and second heald bars 8, 9 and that for the insertion of the lateral strings and the vertical strings can be controlled with a simple control device.

In the apparatus described above, beating levers are inserted between the longitudinal strings to effect necessary beating each time the lateral strings and the vertical strings have been inserted and the motor 4 serving to impart a vertical motion to the support plate 2 is gradually driven in proportion to the progress of the interlacing and, thereby, cause the front of the interlaced lattice to be inched up at a required rate.

As is plain from the foregoing detailed description, the spaces required for permitting the insertion of the lateral strings and the vertical strings from two mutually intersecting directions can be formed by the heald device which is actuated in only one direction, making it possible to interlace simply and efficiently a three-dimensional lattice wherein the lateral strings and the vertical strings are wound and zigzagged about the longitudinal strings as illustrated in FIG. 1(B).

Examples of the material for the strings making up the aforementioned three-dimensional lattice include inorganic fibers such as glass fiber, carbon fiber, metal fiber and asbestos, natural fibers such as silk, cotton, hemp and wool and synthetic fibers such as nylon, polyester and polypropylene. These fibers may be in the form of threads produced by spinning or filaments produced by extruding.

The material for these strings is suitably selected in accordance with the purpose for which the produced flexible-structure composite is used.

The three-dimensionally latticed flexible-structure composite material of the present invention is obtained by causing only the component strings of the three-dimensional lattice formed as described above to be impregnated with a plastic material selected as a precursor for matrix and allowing the plastic material adhering to the strings to solidify. When a synthetic resin is used as the plastic material, for example, the composite material aimed at is obtained by immersing the three-dimensional lattice in a molten resin held in a tank and, after thorough impregnation, removing it from the resin bath, allowing the excess molten resin to drip off the lattice and drying the wet lattice to set the resin. As a result, there is produced a three-dimensional composite wherein the component strings are coated with the resin and voids are interposed between the adjacent component strings as illustrated in FIG. 8. Where the coat of resin thus formed is desired to have a small thickness, the three-dimensional lattice is subjected to centrifugation immediately after removal from the resin bath. When bubbles occur between the three-dimensional lattice and the molten resin while the former is immersed in the latter, they degrade the mechanical strength of the three-dimensional composite material obtained. Optionally, therefore, the lattice which has been removed from the resin bath may be deaerated by means of a vacuum pump. Alternatively, the three-dimensional composite may be obtained by first interlacing strings already impregnated with the plastic material thereby producing a three-dimensional lattice and subsequently causing the plastic material adhering to the strings to solidify.

As the precursor for the matrix to be formed on the component strings of the three-dimensional lattice, although there is generally used an organic material such as synthetic resin or rubber, an inorganic material may be used optionally. Examples of inorganic materials which are advantageously used include metals such as copper and aluminum, glass and quartz.

The methods by which the three-dimensional lattice is impregnated with the plastic material and the plastic material adhering to the component strings of the lattice is solidified, therefore, may be suitably selected in accordance with the nature of the particular plastic material being used.

Figure 9:
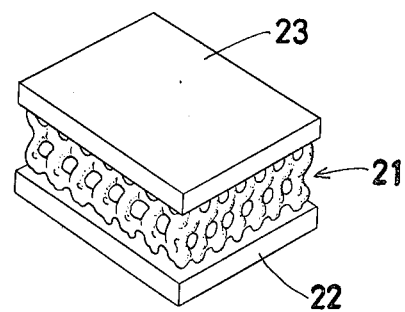
FIG. 9 is a perspective view of another embodiment of the three-dimensionally latticed flexible-structure composite according to the present invention.

FIG. 9 illustrates a typical article having a capacity for shock absorption, which is produced by interposing the three-dimensionally latticed flexible-structure composite of this invention between a pair of plates 22, 23. To produce this article, the three-dimensional lattice 21 is immersed in the resin bath and, after thorough impregnation, the wet lattice is placed in a mold. Inside the mold, the molten resin which flows down the lattice collects. Then, the wet lattice as held in the mold is treated to have the molten resin solidified. Consequently, the plate member 22 of the resin is integrally formed on one side of the lattice. Then, the lattice is turned upside down and placed in the mold and the molten resin is poured in the mold and allowed to solidify. Consequently, the other plate member 23 is integrally formed on the other side of the lattice.

Figure 10:
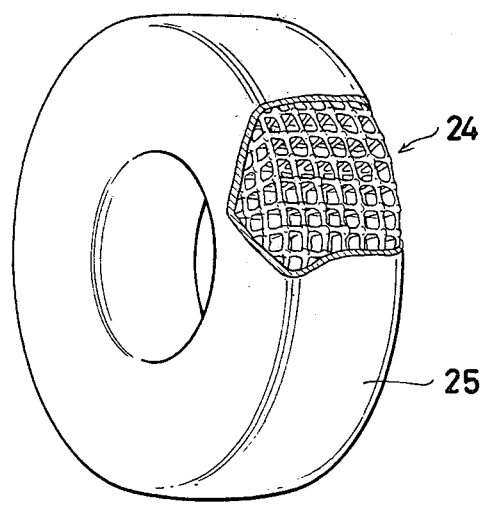
FIG. 10 is a partially cutaway perspective view of the flexible-structure composite of this invention as used in a vehicular wheel.
Figure 11:
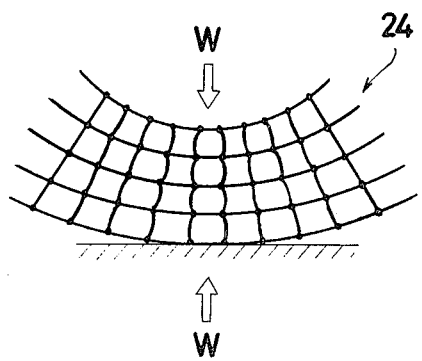
FIG. 11 is an explanatory diagram illustrating the manner in which the vehicular wheel of FIG. 10 is deformed under load applied thereto.

FIG. 10 illustrates a typical use of the flexible-structure composite of this invention as a shock-absorbing member which corresponds to a pneumatic tube in a vehicular wheel. An annular three-dimensional lattice of a size suitable for incorporation in a tire is fabricated by interlacing metal wires abounding with resilience and then coated with a matrix of rubber. The product enjoys a high capacity for absorbing external shocks. This shock-absorbing member 24 is wrapped around a rim and is covered with a tire 25. In the vehicular wheel constructed as described above, the shock-absorbing member 24 is deformed under a load as shown in FIG. 11. A load W applied to the wheel is distributed to a multiplicity of radially disposed metal wires. The wheel provides effective shock absorption by the multiplicity of metal wires being bent proportionately to their share of the load. Particularly since the shock-absorbing member 24 possesses a high strength sufficient to endure repeated application of loads, the vehicular wheel enjoys outstanding durability.

When a three-dimensional lattice is formed of thick synthetic fibers and is impregnated with a molten polyester resin as the matrix material, the structure composite produced may be used as a shock-absorbing member.

If the voids of the present structure composite formed between the adjacent component strings coated with the matrix are filled with a highly effective sound-absorption material, there is obtained a flexible structure composite having effective sound-absorption property.

Now, the mechanical strength of the flexible-structure composite obtained by this invention will be described.

Three lattices were prepared by interlacing a string of glass roving (specific gravity 2.25, 2.370 tex., and diameter of 2 mm.) in a construction of FIG. 1(B) with a varying pitch shown in Table 1 below.

TABLE 1

| Structure of interlaced strings | Pitches of strings (mm) | | | | | |
|---|---|---|---|---|---|---|
| | Zx | Zy | Xy | Xz | Yx | Yz |
| 1 | 2.8 | 2.8 | 2.8 | 50.0 | 2.8 | 50.0 |
| 2 | 2.8 | 2.8 | 2.8 | 30.0 | 2.8 | 30.0 |
| 3 | 2.8 | 2.8 | 2.8 | 15.0 | 2.8 | 15.0 |

In the table given above, "Zx" denotes the pitch between the lateral strings X on the longitudinal string Z and "Zy" the pitch between the vertical strings Y on the longitudinal string Z. Similarly, "Xy" denotes the pitch between the vertical strings Y on the lateral string X and "Xz" the pitch between the longitudinal strings Z on the lateral string X. Samples of a fixed size were cut from the three lattices prepared as described above. Each sample was immersed in a bath of molten epoxy resin (specific gravity 1.16) as the precursor for the matrix and, after thorough impregnation, removed from the bath and left to stand until voids were formed between the adjacent component strings in the lattice. At this point, the molten resin adhering to the lattice was subjected to primary curing (at 23° C.). Then it was subjected to secondary curing at 75° C. for 12 hours. For the purpose of comparison, a shaped article made solely of the resin in a size identical to the size of the sample and a shaped article fo the same size formed by having the same three-dimensional lattice solidly packed with the resin were separately produced and similarly treated to have the molten resin solidified. The samples thus obtained were found to have specific gravities as shown in Table 2.

TABLE 2

| Sample | Specific gravity |
|---|---|
| Latticed composite of structure 1 | 0.67 |
| Latticed composite of structure 2 | 0.75 |
| Latticed composite of structure 3 | 0.84 |
| Comparative sample | |
| Composite 4 having structure 1 packed with resin | 1.35 |
| Composite 5 having structure 2 packed with resin | 1.36 |
| Composite 6 having structure 3 packed with resin | 1.40 |
| Solid block 7 of resin | 1.16 |

The samples of Table 2 were tested for specific flexural stress. The results were as shown in the graph of FIG. 12. It is noted from this graph that the sample packed solidly with the resin sustained cracks and shedded chips when the load exerted thereon built up to a level approximating the yield point thereof. By contrast, the samples according to the present invention sustained absolutely no discernible breakage but exhibited outstanding specific flexural stress and specific flexural modulus of elasticity upon exposure to a load approximating the yield point. When the load was increased, they sustained breakage at points where the component strings of glass roving intersected each other. Further development of breakage from the broken points of interlacing was prevented, enabling the samples to endure the load until the breakage developed to the subsequent points of interlacing.

From the sample No. 2, test pieces 20 cm in length, 2 cm in height and 2 cm in width were prepared. They were tested for shear by a shear tester at a shear rate of 0.3 rotation/minute. FIG. 13 is a graph showing the relation between the repeated shear stress and strain determined of the test pieces.

In FIG. 13, when a test piece was twisted by about 70° and released from the twisting, it exhibited a strain of about 0.8%. When the resultant test piece was again twisted by about 80° and released from the twisting, it exhibited a strain of about 1.5%. Then, a twisting of the test piece by between 80° and 90° was effected three times, whereafter, the strain of the test piece was found to be less than 2%.

From the fact that a control test piece filled with a resin was disintegrated when twisted by about 30°, it is clear that the structure composite of the present invention has excellent properties under the repeated application of load.

As described above, the flexible-structure composite of the present invention is obtained by first preparing a reinforcing three-dimensional lattice and then applying a matrix in the form of a coat to this reinforcement as the backbone, it constitutes itself a flexible-structure composite which combines the advantages of light weight and high strength against repeated application of load.

By proper selection of the material of the component string making up the three-dimensional lattice, the construction of the lattice, the material of the matrix and the amount of the matrix caused to adhere to the backbone, therefore, the composite material of this invention can be expected to find extensive utility as structural materials in shock-absorbing mats, vehicular wheels, aircraft parts, buildings and ships.

What is claimed as new and desires to be secured by Letters Patent of the United States is:

1. A three-dimensional latticed flexible-structure composite comprising:
    a plurality of substantially straight longitudinal strings, lateral strings, and vertical strings, each of said strings having a predetermined thickness;
    a three-dimensional lattice which comprises said longitudinal strings and which further comprises said lateral and vertical strings wound and zigzagged about said longitudinal strings such that adjacent lateral and vertical strings orientated in the same direction form a first pitch greater than said predetermined thickness of said lateral and vertical strings and adjacent longitudinal strings form a second pitch greater than the combined predetermined thickness of said lateral and vertical strings therebetween; and
    a matrix material impregnated on said longitudinal, lateral and vertical strings of said three-dimensional lattice such that said matrix material adheres to said longitudinal, lateral, and vertical strings so that said three-dimensional lattice composite has voids formed between the adjacent longitudinal, lateral and vertical strings coated with said matrix material.

2. The flexible-structure composite according to claim 1, wherein the string of which the three-dimensional lattice is formed further comprises a single fiber selected from the group consisting of glass fiber, carbon fiber, metal fiber, inorganic fiber, natural fiber and synthetic fiber.

3. The flexible-structure composite according to claim 1, wherein the matrix material further comprises a single material selected from the group consisting of organic materials, inorganic materials and metallic materials.

4. The flexible-structure composite according to claim 1, wherein said longitudinal, lateral and vertical strings further comprise deaerated string.